(12) United States Patent
Chen

(10) Patent No.: US 9,730,065 B1
(45) Date of Patent: *Aug. 8, 2017

(54) CREDENTIAL MANAGEMENT

(71) Applicant: MicroStrategy Incorporated, Vienna, VA (US)

(72) Inventor: Gang Chen, Vienna, VA (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/213,152

(22) Filed: Jul. 18, 2016

Related U.S. Application Data

(63) Continuation of application No. 13/854,688, filed on Apr. 1, 2013, now Pat. No. 9,397,980.

(Continued)

(51) Int. Cl.
*H04L 29/00* (2006.01)
*H04W 12/06* (2009.01)
(Continued)

(52) U.S. Cl.
CPC ............ *H04W 12/06* (2013.01); *G06F 21/33* (2013.01); *G06F 21/36* (2013.01); *G06F 21/45* (2013.01);
(Continued)

(58) Field of Classification Search
CPC .. H04W 12/06; H04W 12/04; H04L 63/0823; H04L 63/08; H04L 63/0815;
(Continued)

(56) References Cited

U.S. PATENT DOCUMENTS

2005/0154889 A1* 7/2005 Ashley ................ H04L 63/0435
713/171
2007/0214356 A1 9/2007 Song
(Continued)

OTHER PUBLICATIONS

Wikipedia, "Certificate authority," Wikipedia [online] Aug. 8, 2012 [retrieved on Aug. 15, 2012]. Retrieved from the Internet: <URL: http://en.wikipedia.org/wiki/Certificate_authority>, 4 pages.
(Continued)

*Primary Examiner* — Noura Zoubair
(74) *Attorney, Agent, or Firm* — Fish & Richardson P.C.

(57) ABSTRACT

In general, one aspect of the subject matter described in this specification can be embodied in methods that include receiving a registration request from a mobile device to create a credential management account for a user associated with the mobile device; generating a public key and a paired private key associated with the credential management account; transmitting a certificate signing request to a certificate authority system; receiving a digital certificate from the certificate authority system; receiving a request to retrieve a credential for the user from a credential issuing organization; transmitting a request for the credential for the user to the credential issuing organization system; receiving, from the credential issuing organization; transmitting the decrypted data to the credential issuing organization; receiving data for the credential for the user from the credential issuing organization system; and transmitting data encoding a portion of a badge representing the credential.

14 Claims, 8 Drawing Sheets

Related U.S. Application Data

(60) Provisional application No. 61/788,391, filed on Mar. 15, 2013.

(51) Int. Cl.
*H04L 29/06* (2006.01)
*H04L 9/32* (2006.01)
*H04W 12/04* (2009.01)
*G06F 21/33* (2013.01)
*G06F 21/36* (2013.01)
*G06F 21/45* (2013.01)

(52) U.S. Cl.
CPC .......... *H04L 9/3213* (2013.01); *H04L 9/3263* (2013.01); *H04L 63/0823* (2013.01); *H04W 12/04* (2013.01); *H04L 2209/805* (2013.01)

(58) Field of Classification Search
CPC ............ H04L 63/0442; H04L 63/0435; H04L 63/101; H04L 63/104; H04L 9/3213; H04L 9/3263; G06F 21/31–21/36; G06F 21/45
See application file for complete search history.

(56) References Cited

U.S. PATENT DOCUMENTS

| | | | |
|---|---|---|---|
| 2008/0319905 A1 | 12/2008 | Carlson | |
| 2009/0132813 A1* | 5/2009 | Schibuk ............... | G06Q 20/223 713/158 |
| 2010/0138344 A1* | 6/2010 | Wong ..................... | G06Q 20/10 705/44 |
| 2013/0073859 A1* | 3/2013 | Carlson ................. | H04L 63/123 713/176 |

OTHER PUBLICATIONS

Wikipedia, "Certificate signing request," Wikipedia [online] Aug. 20, 2013 [retrieved on Aug. 24, 2012]. Retrieved from the Internet: <URL: http://en.wikipedia.org/wiki/Certificate_signing_request>, 4 pages.
Wikipedia, "Cryptographic hash function," Wikipedia [online] Aug. 8, 2012 [retrieved on Aug. 15, 2012]. Retrieved from the Internet: <URL: http://en.wikipedia.org/wiki/Cryptographic_hash_function>, 5 pages.
Wikipedia, "Digital signature," Wikipedia [online] Aug. 14, 2012 [retrieved on Aug. 15, 2012]. Retrieved from the Internet: <URL: http://en.wikipedia.orgiwiki/Digital_signature>, 10 pages.
Wikipedia, "ID-based encryption," Wikipedia [online] Jul. 27, 2012 [retrieved on Aug. 15, 2012]. Retrieved from the Internet: <URL: http://en.wikipedia.org/wiki/Identity_based_encryption>, 5 pages.
Wikipedia, "Message authentication code," Wikipedia [online] Aug. 8, 2012 [retrieved on Aug. 15, 2012]. Retrieved from he Internet: <URL: http://en.wikipedia.org/wiki/Message_authentication_codes>, 4 pages.
Wikipedia, "Multi-factor authentication," Wikipedia [online] Aug. 6, 2012 [retrieved on Aug. 15, 2012]. Retrieved from the Internet: <URL: http://en.wikipedia.org/wiki/Multi-factor_authentication>, 3 pages.
Wikipedia, "Public key certificate," Wikipedia [online] Aug. 12, 2012 [retrieved on Aug. 15, 2012]. Retrieved from the Internet: <URL: http://en.wikipedia.org/wiki/Digital_certificates>, 7 pages.
Wikipedia, "Public-key cryptography," Wikipedia [online] Aug. 15, 2012 [retrieved on Aug. 15, 2012]. Retrieved from the Internet: <URL: http://en.wikipedia.org/wiki/Public-key_cryptography>, 12 pages.
Wikipedia, "Public-key infrastructure," Wikipedia [online] Aug. 8, 2012 [retrieved on Aug. 15, 2012]. Retrieved from the Internet: <URL: http://en.wikipedia.org/wiki/Public_Key_Infrastructure>, 6 pages.
Wikipedia, "SecureID," Wikipedia [online] Jul. 5, 2012 [retrieved on Aug. 15, 2012]. Retrieved from the Internet: <URL: http://en.wikipedia.org/wiki/SecurID>, 5 pages.
Wikipedia, "Two-factor authentication," Wikipedia [online] Aug. 13, 2012 [retrieved on May 15, 2012]. Retrieved from the Internet: <URL: http://en.wikipedia.org/wiki/Two-factor_authentication>, 15 pages.

\* cited by examiner

CREDENTIAL MANAGEMENT

CLAIM OF PRIORITY

This application claims priority under to U.S. patent application Ser. No. 13/854,688, filed Apr. 1, 2013, the entire contents of which are hereby incorporated by reference, which claims priority to provisional U.S. Patent Application No. 61/788,391, filed on Mar. 15, 2013, the entire contents of which are hereby incorporated by reference.

BACKGROUND

Various methods can be used to establish or verify the identity and/or authority of an individual. For example, people use physical badges to identify themselves and establish their authority or permissions in a variety of contexts. In one particular example, a person may present an employee badge to gain access to an employer's building.

SUMMARY

In one aspect of the present disclosure, a method performed by one or more processing devices includes receiving a registration request from a mobile device to create a credential management account for a user associated with the mobile device, the registration request including a unique identifier for the mobile device and a unique identifier for the user associated with the mobile device; generating a public key and a paired private key associated with the credential management account; storing the public key and the private key; transmitting a certificate signing request to a certificate authority system, the certificate signing request comprising the public key, the unique identifier for the mobile device, and the unique identifier for the user associated with the mobile device; receiving a digital certificate from the certificate authority system, the digital certificate comprising the public key and the unique identifier for the user; receiving, from the mobile device, a request to retrieve a credential for the user from a credential issuing organization; in response to receiving the request to retrieve the credential for the user from the credential issuing organization, transmitting a request for the credential for the user to the credential issuing organization system, the request for the credential for the user comprising the digital certificate; receiving, from the credential issuing organization, data encrypted using the public key; in response to receiving the data encrypted using the public key, decrypting the encrypted data using the private key to yield decrypted data; transmitting the decrypted data to the credential issuing organization; receiving data for the credential for the user from the credential issuing organization system; and transmitting data encoding a portion of a badge representing the credential for the user to the mobile device.

Implementations of the disclosure can include one or more of the following features. In some implementations, the method includes storing the data for the credential in a record associated with the credential management account. In still other implementations, the method includes receiving data for a second credential from the credential issuing organization system; storing the data for the second credential in a record associated with the credential management account; and transmitting data encoding a portion of a badge representing the second credential to the mobile device.

In still another aspect of the disclosure, one or more machine-readable media are configured to store instructions that are executable by one or more processing devices to perform operations including receiving a registration request from a mobile device to create a credential management account for a user associated with the mobile device, the registration request including a unique identifier for the mobile device and a unique identifier for the user associated with the mobile device; generating a public key and a paired private key associated with the credential management account; storing the public key and the private key; transmitting a certificate signing request to a certificate authority system, the certificate signing request comprising the public key, the unique identifier for the mobile device, and the unique identifier for the user associated with the mobile device; receiving a digital certificate from the certificate authority system, the digital certificate comprising the public key and the unique identifier for the user; receiving, from the mobile device, a request to retrieve a credential for the user from a credential issuing organization; in response to receiving the request to retrieve the credential for the user from the credential issuing organization, transmitting a request for the credential for the user to the credential issuing organization system, the request for the credential for the user comprising the digital certificate; receiving, from the credential issuing organization, data encrypted using the public key; in response to receiving the data encrypted using the public key, decrypting the encrypted data using the private key to yield decrypted data; transmitting the decrypted data to the credential issuing organization; receiving data for the credential for the user from the credential issuing organization system; and transmitting data encoding a portion of a badge representing the credential for the user to the mobile device. Implementations of this aspect of the present disclosure can include one or more of the foregoing features.

In still another aspect of the disclosure, an electronic system includes one or more processing devices; and one or more machine-readable media configured to store instructions that are executable by the one or more processing devices to perform operations including: receiving a registration request from a mobile device to create a credential management account for a user associated with the mobile device, the registration request including a unique identifier for the mobile device and a unique identifier for the user associated with the mobile device; generating a public key and a paired private key associated with the credential management account; storing the public key and the private key; transmitting a certificate signing request to a certificate authority system, the certificate signing request comprising the public key, the unique identifier for the mobile device, and the unique identifier for the user associated with the mobile device; receiving a digital certificate from the certificate authority system, the digital certificate comprising the public key and the unique identifier for the user; receiving, from the mobile device, a request to retrieve a credential for the user from a credential issuing organization; in response to receiving the request to retrieve the credential for the user from the credential issuing organization, transmitting a request for the credential for the user to the credential issuing organization system, the request for the credential for the user comprising the digital certificate; receiving, from the credential issuing organization, data encrypted using the public key; in response to receiving the data encrypted using the public key, decrypting the encrypted data using the private key to yield decrypted data; transmitting the decrypted data to the credential issuing organization; receiving data for the credential for the user from the credential issuing organization system; and transmitting data encoding a portion of a badge representing the credential for the user to the mobile device. Implementations of this aspect of the present disclosure can include one or more of the foregoing features.

All or part of the foregoing can be implemented as a computer program product including instructions that are stored on one or more non-transitory machine-readable storage media, and that are executable on one or more processing devices. All or part of the foregoing can be implemented as an apparatus, method, or electronic system that can include one or more processing devices and memory to store executable instructions to implement the stated functions.

The details of one or more implementations are set forth in the accompanying drawings and the description below. Other features will be apparent from the description and drawings, and from the claims.

DETAILED DESCRIPTION

Figure 1:
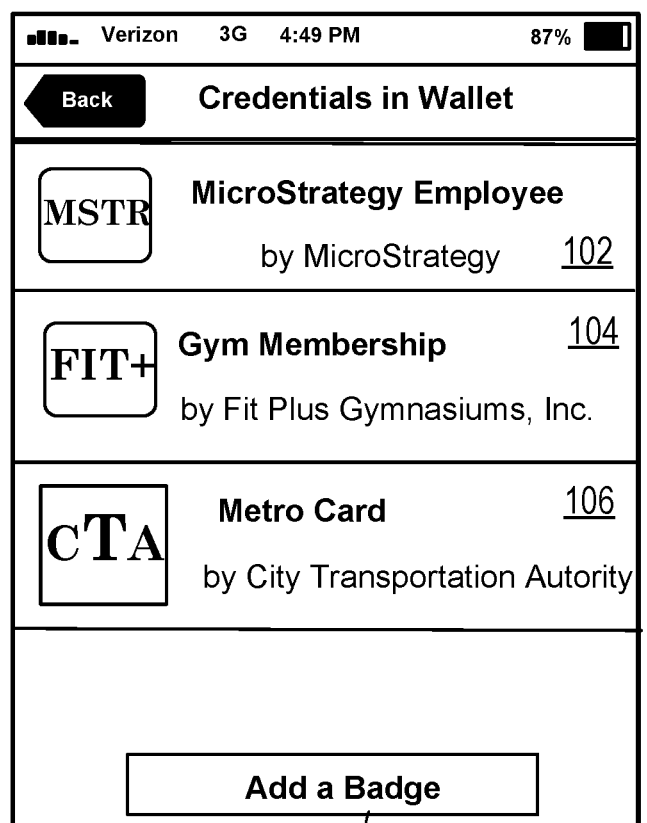
FIG. 1 illustrates an example of a graphical user interface for displaying a list of badges representing credentials.

A system consistent with this disclosure provides an application through which users may request and acquire access to credentials. Credentials may be issued to users by one or more credential issuing organizations. For example, an employer may be a credential issuing organization that issues credentials to its employees that are specific to the employees' job functions. Some other examples of credential issuing organizations are a government agency, a telecommunications service provider, a banking or other financial services institution, a gym, or a museum, among others. Credentials may be used to gain access to services or facilities provided by a credential issuing organization, to establish permission to engage in an activity (e.g., driving a motor vehicle or traveling), and/or to act on behalf of a credential issuing organization. Some examples of credentials include a gym membership for entering a private gymnasium, a pass for riding a train, an employee credential for signing documents on behalf of an employer, a driver's license, a passport, or an identity card among others.

In some implementations, a credential management application enables a user to manage and utilize multiple credentials, each potentially issued by a different credential issuing organization. The application may enable the user to access the user's credentials through a client application running on a client device. For example, a client application on the user's client device may present a badge (e.g., a graphical representation of data for a credential) corresponding to a credential associated with the user. The application may also interface with credential issuing organizations to retrieve data for credentials associated with users of the application.

In such a system, the credential issuing organizations, which issue credentials, generally may trust the credential management system to limit access to credentials to the proper users. In some implementations, a certificate authority with knowledge of unique individual identifiers (e.g. government-issued identity numbers, social security numbers, driver's license numbers, passport numbers, telephone numbers, customer numbers, etc.) for users may be employed to increase trust in the system for managing the credentials. The certificate authority may confirm an association between a unique user identifier and an identifier for a client device of the user to which credentials may be distributed and/or an identifier for a credential management account. For example, the certificate authority may generate and transmit a digital certificate including both a unique identifier for a user along with an identifier for the user's client device and/or a public key associated with a credential management account of the user. A system receiving the digital certificate may authenticate the association between the user and the user's client device and/or the user's credential management account, for example, by using public-key infrastructure (PKI) techniques to authenticate the digital certificate.

In an illustrative example, the certificate authority is operated by a telecommunications company that has sold a mobile client device (e.g., a smartphone) to a user. For example, the telecommunications company may sell mobile phones to be used on a wireless network operated by the telecommunications company and may preinstall a credential management client application on mobile devices that the telecommunications company sells. When a user buys a mobile phone, the telecommunications company keeps a record of the identifier for the mobile phone and a unique identifier for the user (e.g., the user's social security number, government issued identity number, customer number, etc.), which may have been acquired by the telecommunications company by requesting the presentation of proof of identity during the process of purchasing the mobile client device.

After purchasing a phone, the user registers the mobile phone with a credential management server to create a credential management account. An application executing on the mobile phone also may generate a public/private key pair associated with the credential management account for the user. In this illustrative example, the mobile phone may send a certificate signing request (CSR) to the certificate authority operated by the telecommunications company. The CSR may include the user's public key associated with the credential management account, the identifier for the mobile client device, and the unique identifier for the user (e.g., the user's social security number, government issued identity number, customer number, etc.).

The certificate authority then confirms that the mobile client device identifier and the unique identifier for the user are associated in the records of the telecommunication company. If this condition is satisfied, the certificate authority returns a digital certificate to the user's mobile client device that includes the public key for the credential management account, the identifier for the mobile client device, and the unique identifier for the user. By issuing this digital certificate in a public-key infrastructure (PKI) environment, the certificate authority may provide a more trusted association between a credential management account (e.g., as represented by the public key) and an authenticated user (e.g., as represented by the unique identifier for the user).

In the illustrative example, the user may then use the digital certificate to gain access through an electronic communications network to a credential that has been issued to the user by a credential issuing organization (e.g., the user's employer). When the credential issuing organization issues the credential to the user, the credential issuing organization may record the unique identifier (e.g., the social security number, government issued identity number, customer number, etc.) for the user and associate this unique identifier with the issued credential.

For example, an employer may issue an employee credential to one of its employees and create a record storing information about the credential with a social security number or other government issued identifier that the employee has provided to the employer (e.g., during the hiring process). In order to enable the employee to access the credential on the employee's mobile client device, the employee's mobile device (e.g., responsive to input from the employee) may send a credential request including the digital certificate to a server system operated by the employer. The employer then determines if it has issued a credential to an employee associated with the social security number communicated with the digital certificate in the request for the credential. If so, the employer then uses PKI-based techniques along with the digital certificate communicated with the credential request to confirm that the user requesting the credential is, in fact, the employee with the social security number to whom the employer issued the credential. After confirming the identity of the employee in this manner, the employer may generate and store a token for the user. In addition, the employer may transmit a copy of the token (e.g., encrypted using the user's public key) to the user's mobile client device. The employer also may store a copy of the employee's public key received in connection with the credential request. In storing the employee's public key, the employer may associate the employee's public key with the employee.

In the illustrative example, the client application running on the user's mobile client device then transmits a request to retrieve the credential issued by the employer to the credential management server. This request may include information identifying the credential management account of the user as well as the token provided to the user by the employer. If the employer used the user's public key to encrypt the token before providing the token to the user, the user's mobile client device may use the user's private key to decrypt the token before transmitting the request to retrieve the credential issued by the employer to the credential management server. The credential management server then may use an interface (which may be referred to herein as a connector) to the employer to transmit the token for the user to the employer. In some implementations, the interface to the employer may be a secure dedicated interface to the employer. The employer may use the received token to identify the user and any credential(s) associated with the user. A credential issuing server operated by the employer then may transmit data for the identified credential(s) to the credential management server. The credential management server may then make this data accessible to the user via the client application running on the user's mobile client device (e.g., smart phone or tablet). The client application may present some of the data for a credential issued by the employer in the form of a badge that is displayed on the mobile client device. The badge may include a visual representation of the credential. For example, the user may cause the badge to be displayed and present the badge to gain access to the employer's office or other property.

FIG. 1 illustrates an example of a graphical user interface 100 for displaying a collection of badges representing credentials (102, 104, and 106). In the example of FIG. 1, graphical user interface 100 is displayed on a client device through an application, including, e.g., an application for accessing credentials. Graphical user interface 100 may allow a user to access and interact with a variety of credentials that have been issued to the user by various credential issuing organizations. In the example of FIG. 1, graphical user interface 100 includes an employee credential 102 that is issued by an employer, a gym member credential 104 that is issued by a gymnasium company, and a metro card credential 106 that is issued by a civil transportation authority. In the depicted example, the credentials are issued by different credential issuing organizations. In other examples, a user may have access to multiple credentials from a certain credential issuing organization. In some implementations, data for the credentials (102, 104, and 106) listed may be stored on a remote server (e.g., a credential management application server) and the server may make the credentials available to the user through the use of the client application running on the client device. Graphical user interface 100 may also include an "add a badge" icon 112 that may be selected by the user to add a new badge that represents another credential. The user may select one of the credentials in the list (102, 104, or 106) to display a badge representing the credential, as shown in FIGS. 2-3.

Figure 2:
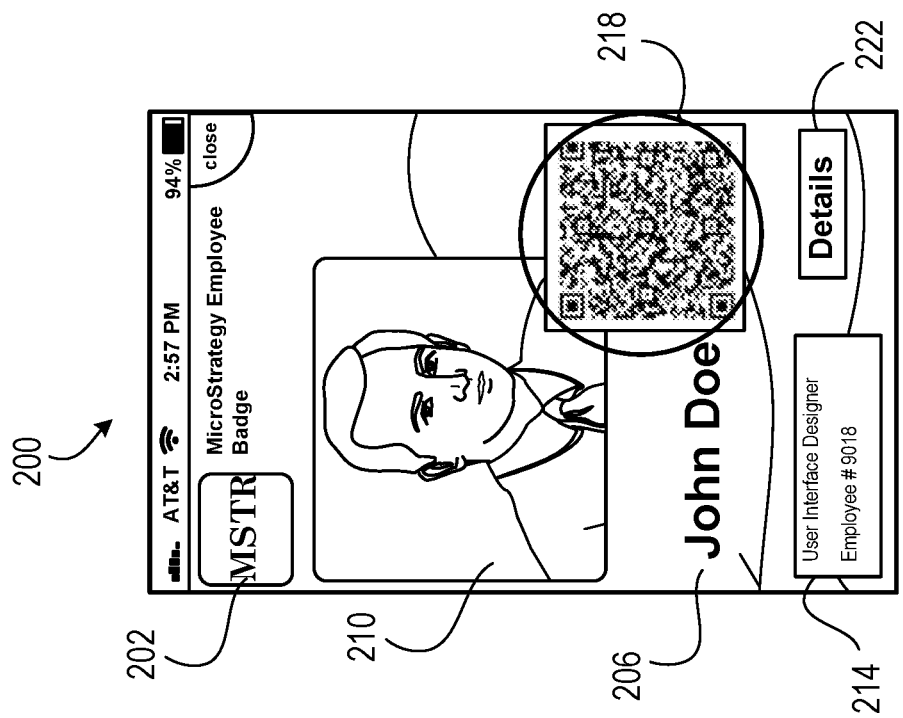

FIG. 2 illustrates an example graphical user interface 200 on a client device that is used to display a portion of a badge that represents a credential that has been issued to the user of the client device. In this example, the user, "John Doe," has been assigned an employee credential issued by his employer, "MicroStrategy". A portion of the badge that may correspond to the front of a physical badge is displayed in graphical user interface 200. Graphical user interface 200 includes an identifier 202 (e.g., a distinctive mark) of the credential issuing organization that issued the credential (e.g., the user's employer). Graphical user interface 200 may also include the name 206 and a photograph 210 of a user associated with the credential. Graphical user interface 200 may also include information about the credential and/or the associated user 214, such as the employee's title and an employee identification number. Graphical user interface 200 may also include a quick response (QR) code 218 (or other validation mechanism) that identifies the credential represented by the badge. In some implementations, QR code 218 may be scanned by a validation device to access more information about the credential and/or to validate the credential.

Figure 3:
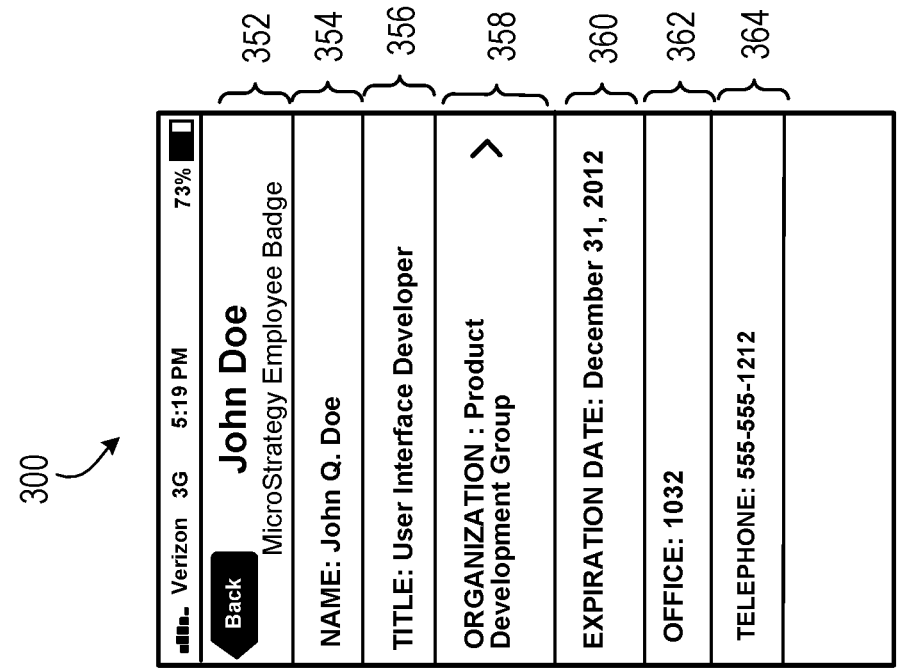
FIGS. 2-3 illustrate examples of graphical user interfaces for displaying a badge representing a credential.

Graphical user interface 200 may also include a "details" icon 222 that, when selected by a user, causes graphical user interface 300 of FIG. 3 to be displayed. For example, graphical user interface 300 may correspond to the back of a physical badge. For example, graphical user interface 300 may include a name for the credential 352, a name of a user 354 associated with the credential, a title of the user 356 associated with the credential, a name of an organization 358 associated with the credential, an indication of an expiration date 360 for the credential, an office number 362 of the user associated with the credential, and a telephone number 364 of the user associated with the credential. When an icon displaying the name of the organization associated with the credential is selected by a user, additional information about the organization may be displayed. The information displayed in a badge for a credential may be specific to the credential that the badge represents, thus the type of information displayed may vary with the type of credential the badge represents.

Figure 4:
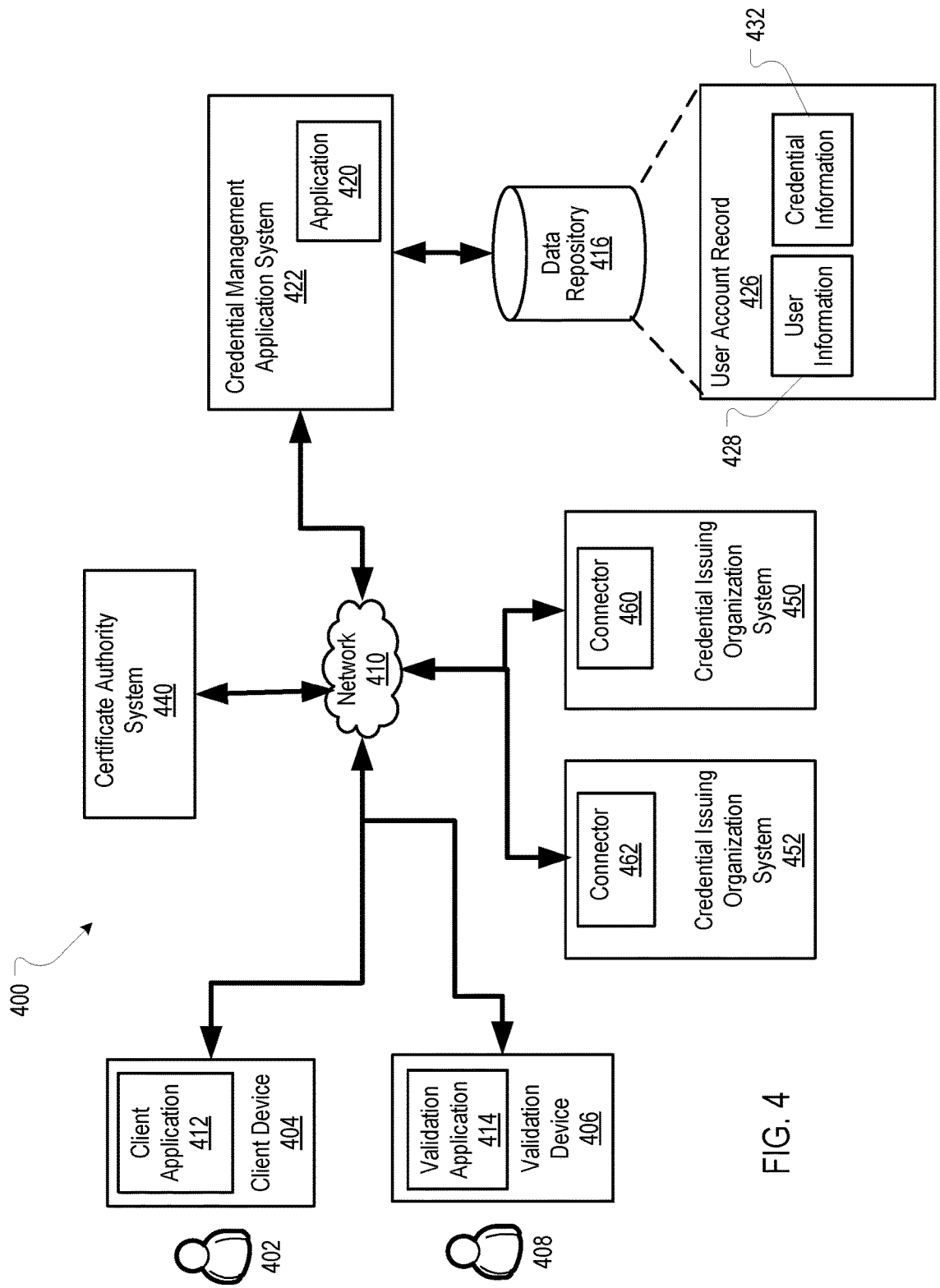
FIG. 4 is a block diagram of an example of a network environment enabling provisioning and management of credentials.

FIG. 4 is a block diagram of an example network environment 400 enabling user access to credentials. Network environment 400 includes network 410, client device 404, validation device 406, credential management application system 422, data repository 416, certificate authority system 440, and credential issuing organization systems 450, 452. Network environment 400 may include many thousands of data repositories, client devices, validation systems, application systems, certificate authority systems, and credential issuing organization systems, which are not shown.

In an example, client device 404 is associated with user 402 (e.g., user 402 may own, operate, and/or be logged in to client device 404). In this example, user 402 may access credentials that have been issued to user 402 using a client application 412 running on client device 404. For example, a badge representing a credential accessible to user 402 through client application 412 may be presented in a display of client device 404. For example, user 402 may present a badge representing a credential to people and/or machines in order to gain access to a location or a resource (e.g., to gain access to a secured building, a transportation system, a gymnasium, a locker, etc.) In some cases, a badge representing a credential may be presented to another user who is operating a validation system for validating credentials.

In the example of FIG. 4, validation device 406 is associated with user 408. In this example, user 408 may process information from a badge representing a credential that is submitted by another user to access additional information about the credential and to validate the credential. For example, validation device 406 may include a scanner (e.g., a QR code scanner) for reading a portion of a badge representing a credential that is presented by another user (e.g., user 402) on a client device (e.g., client device 404). Validation application 414 may be used to process the scanned information from the badge and to use this information to form a validation request for the credential represented by the badge. The validation request may be transmitted to the credential management application system 422 which may confirm or deny the validity of the presented credential in a validation message responsive to the validation request. In some implementations, the validation message may be digitally signed by the credential management application system 422 using a private key that is paired with a public key that is stored on the validation device 406 and associated with the credential management system 422. The validation application 414 may decrypt the digitally signed validation message with the public key to verify that the validation message is, in fact, received from the credential management application system 422. In some implementations, the credential management application system 422 may provide additional information about the credential or the user (e.g., user 402) associated with the credential in response to a request for additional information from the validation device.

In the example of FIG. 4, application system 422 includes a system that hosts applications, including, e.g., application 420. In this example, application 420 is an application that manages credentials for users and facilitates user access to credentials issued by a variety of credential issuing organizations (e.g., through credential issuing organization systems 450, 452). In an example, client device 404 may download a client application 412 for interacting with application 420 from credential management application system 422 (or another system). In another example, client device 404 may use a web browser to access application 420 from credential management application system 422, e.g., rather than downloading a client application for interacting with application 420 onto client device 404. In an example, application 420 and/or a client application 412 for interacting with application 420 may be configured to render one or more of graphical user interfaces 100, 200, and 300, as shown in FIGS. 1-3, respectively. In this example, through application 420 and/or a client application 412 for interacting with application 420, user 402 of client device 404 may access credentials managed by credential management application system 422 (e.g., a credential issued by credential issuing organization system 450).

The credential management system 422 may enable users (e.g., user 402) to store, manage, and access various different credentials. An individual user may have credentials from multiple credential issuing organizations. For example, a user (e.g., user 402) may have credentials issued by the user's employer, a government agency, a gymnasium, and a bank where the user has an account. An individual user may also have multiple credentials issued by the same credential issuing organization. For example, an employer may issue multiple credentials to an employee user (e.g., user 402). Different credentials from the employer may provide different permissions and/or authority to the user, for example, corresponding to different job functions that the user performs as an employee.

Credential management application system 422 stores, in data repository 416, information about credentials managed by application 420. For example, when user 402 registers with credential management application system 422, the application 420 stores, in data repository 416, a user account record 426, including, e.g., information about user 402 and credentials that have been issued to user 402. In this example, the user account record 426 includes user information 428 (e.g., an identifier for a client device associated with the user, a unique identifier for the user, and/or a pointer to a user identity record in the data repository or remote data storage system) and credential information 432 that identifies and/or describes credentials that have been issued to the user (e.g., issued by credential issuing organization systems 450 or 452) and made available through application 420. Storing and managing multiple credentials issued by different credential issuing organizations in a centralized credential management application system may reduce costs and promote security by allowing the sharing of a common credential access and validation infrastructure. In some implementations, some of the credential information 432 and/or some of the user information 428 stored in user account record 426 may be transmitted to client device 404 to enable the rendering of a badge that represents a credential identified by the credential information 432. In some implementations, the user information 432 also includes (or points to) data for the user that may be relayed through the application 420 to another user operating a validation device 406. For example, the user information 432 may include a name for user 402, a photograph of user 402, demographic information for user 402, and/or other personally identifying information for user 402, including, e.g., a biometric identifier for user 402.

Client application 412 may also be configured to interact with certificate authority 440 to obtain a digital certificate to authenticate the identity of user 402 by associating client device 404 and/or a credential management account that is accessible by user 402 with a unique user identifier (e.g., a government issued identifier, such as a social security number). Client application 412 may use the digital certificate when requesting that access to a credential be granted to user 402 through client application 412 for interacting with application 420 from credential management application system 422. For example, a request for a credential that includes the digital certificate may be transmitted from client device 404 to credential issuing organization system 450. The digital certificate from the certificate authority system may increase trust in the overall system for managing access to credentials.

User 402 may want to access a new credential issued to user 402 by a credential issuing organization through a credential management application to, for example, avoid adding a physical badge or pass to the user's wallet or purse and to avoid keeping track of an additional new authentication technique (e.g., another password). When user 402 successfully requests access to a credential issued by a credential issuing organization, the application 420 may interface directly with the corresponding credential issuing organization system (e.g., credential issuing organization system 450) to retrieve data describing the issued credential. In some implementations, application 420 communicates with a credential issuing organization system (e.g., 450 or 452) through an interface which may be referred to herein as a connector (e.g., connector 460 or 462, respectively). In some implementations, a connector to a credential issuing organization system may be a secure dedicated interface to the credential issuing organization system.

A connector (e.g., connector 460 or 462) to the credential management application system 422 may be established in a variety of ways. In one example, the credential issuing organization may navigate to a URL for the credential management application system 422 and request that a connector be established. The credential management application system 422 may establish an SSL connection with the credential issuing organization and may obtain the SSL certificate for the credential issuing organization system (e.g., systems 450 or 452). From the SSL certificate, credential management application system 422 is able to identify the credential issuing organization's identity and an e-mail address of an administrator associated with the credential issuing organization. The credential management application system 422 then sends an e-mail to this e-mail address with a password. If the credential management application system 422 later receives a follow-up request to establish a connector that specifies the e-mail address and the password sent to the e-mail address, the credential management application system 422 determines that the credential issuing organization has been authenticated. Consequently, the credential management application system 422 establishes a connector (e.g., connector 460 or 462) with the credential issuing organization system (e.g., systems 450 or 452, respectively). In this manner, secure, formatted communications may be established between credential management application system 422 and a credential issuing organization system (e.g., systems 450 or 452).

For example, credential issuing organization system 450 may be operated by a credential issuing organization (e.g., an employer of users 402, 408). Credential management application system 422 may communicate (e.g., via communications over network 410) with the credential issuing organization system 450 through connector 460 to allow for the specification of credential properties and issuing of credentials to users by the credential issuing organization system 450. In some implementations, credential issuing organization system 450 provides a user (e.g., user 402) to whom the credential issuing organization has issued a credential with a token that corresponds to the credential issued to the user by the credential issuing organization. The user may then present the token to the credential management application system 422 as part of a credential registration request sent from the user's client device (e.g., client device 404) to associate the credential with the user's client device. In response, credential management application system 422 may transmit the token to credential issuing organization system 450. The credential issuing organization system 450 then may match the token received from credential management application system 422 to the credential that the credential issuing organization issued to the user and provide data associated with the credential to the credential management application system 422. Thereafter, credential management application system 422 may make the requested credential available to the user.

Figure 5:
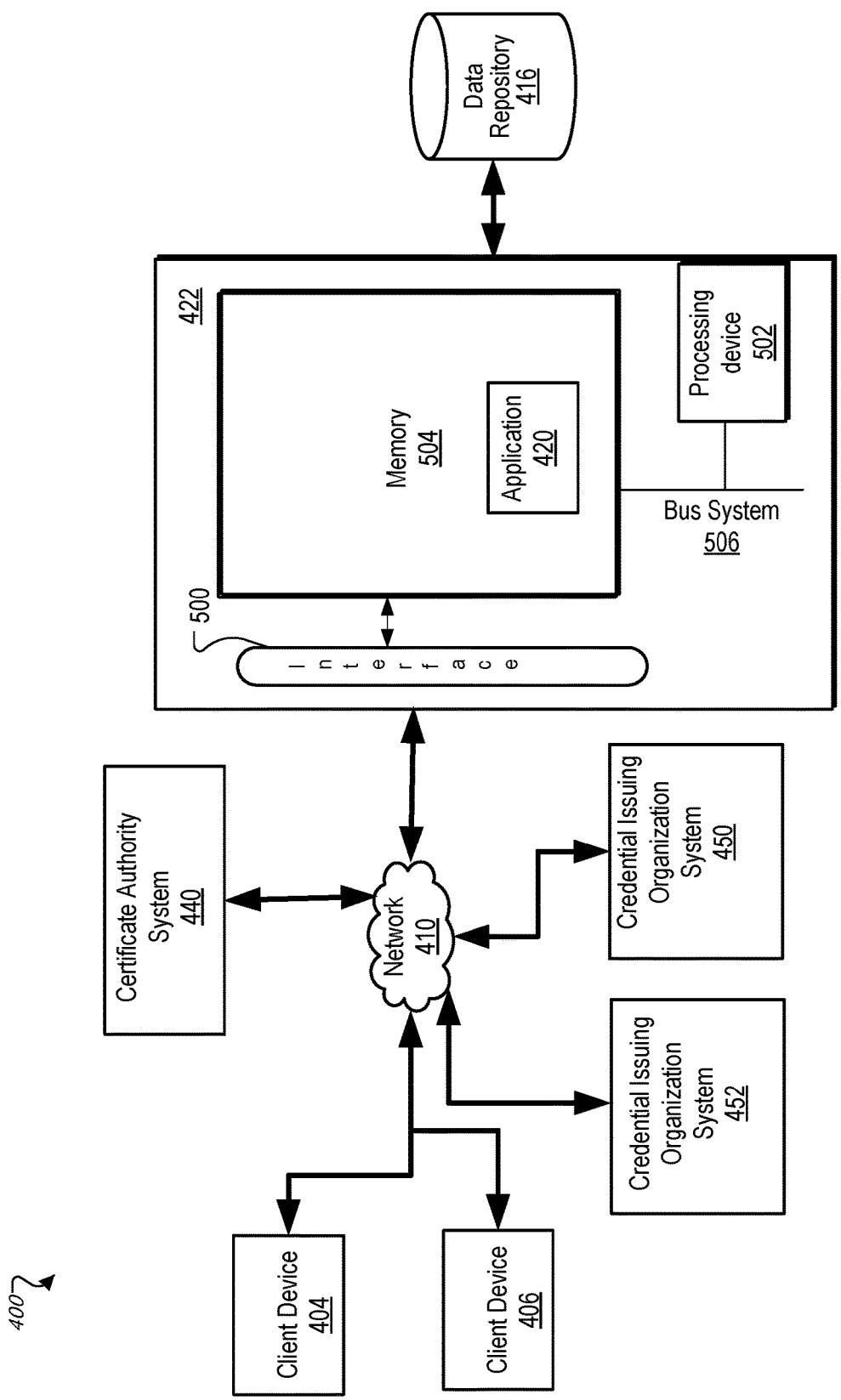
FIG. 5 is a block diagram showing examples of components of a network environment enabling provisioning and management of credentials.

FIG. 5 is a block diagram showing examples of components of network environment 400 enabling sharing and electronic signing of content items with credentials. In the example of FIG. 5, users 402, 408 are not shown.

Application system 422 can be a variety of computing devices capable of receiving data and running one or more services, including, e.g., application 420, which can be accessed by one or more of client devices 404, 406. In an example, application system 422 can include a server, a distributed computing system, a desktop computer, a laptop, a cell phone, a rack-mounted server, any combination of the foregoing, and the like. Application system 422 can be a single server or a group of servers that are at a same position or at different positions. Application system 422 and each of client devices 404, 406, and credential issuing organization systems 450, 452 can run programs having a client-server relationship to each other. Although distinct modules are shown in the figures, in some examples, client and server programs can run on the same device.

Application system 422 can receive data from each of client devices 404, 406, and credential issuing organization systems 450, 452 through input/output (I/O) interface 500. I/O interface 500 can be a type of interface capable of receiving data over a network, including, e.g., an Ethernet interface, a wireless networking interface, a fiber-optic networking interface, a modem, and so forth. Application system 422 also includes a processing device 502 and memory 504. A bus system 506, including, for example, a data bus and a motherboard, can be used to establish and to control data communication between the components of application system 422.

Processing device 502 can include one or more microprocessors. Generally, processing device 502 can include an appropriate processor and/or logic that is capable of receiving and storing data, and of communicating over a network. Memory 504 can include a hard drive and a random access memory storage device, including, e.g., a dynamic random access memory, or other types of non-transitory machine-readable storage devices. As shown in FIG. 5, memory 504 stores computer programs that are executable by processing device 502. These computer programs may include a data engine (not shown) for implementing the operations and/or the techniques described herein. The data engine can be implemented in software running on a computer device (e.g., application system 422), hardware or a combination of software and hardware.

Examples of client device 404 and/or validation device 406 include smartphones, cellphones, tablets, laptops, and personal computers, among others. A client device 404 or a validation device 406 may include one or more microprocessors, memory, a display, and a network communications interface (e.g., a wireless network interface including an antenna), among other components. A validation device may also include a scanner device (e.g., a digital camera) for capturing information presented in a badge. In some implementations, a single device may be both a client device and a validation device in the sense that it provides both the credential access and management functionality to a user and credential validation functions that may be applied to credentials presented by other users of the credential management application system 422. For example, a smartphone may be configured to run both client application 412 and validation application 414.

Figure 6A:
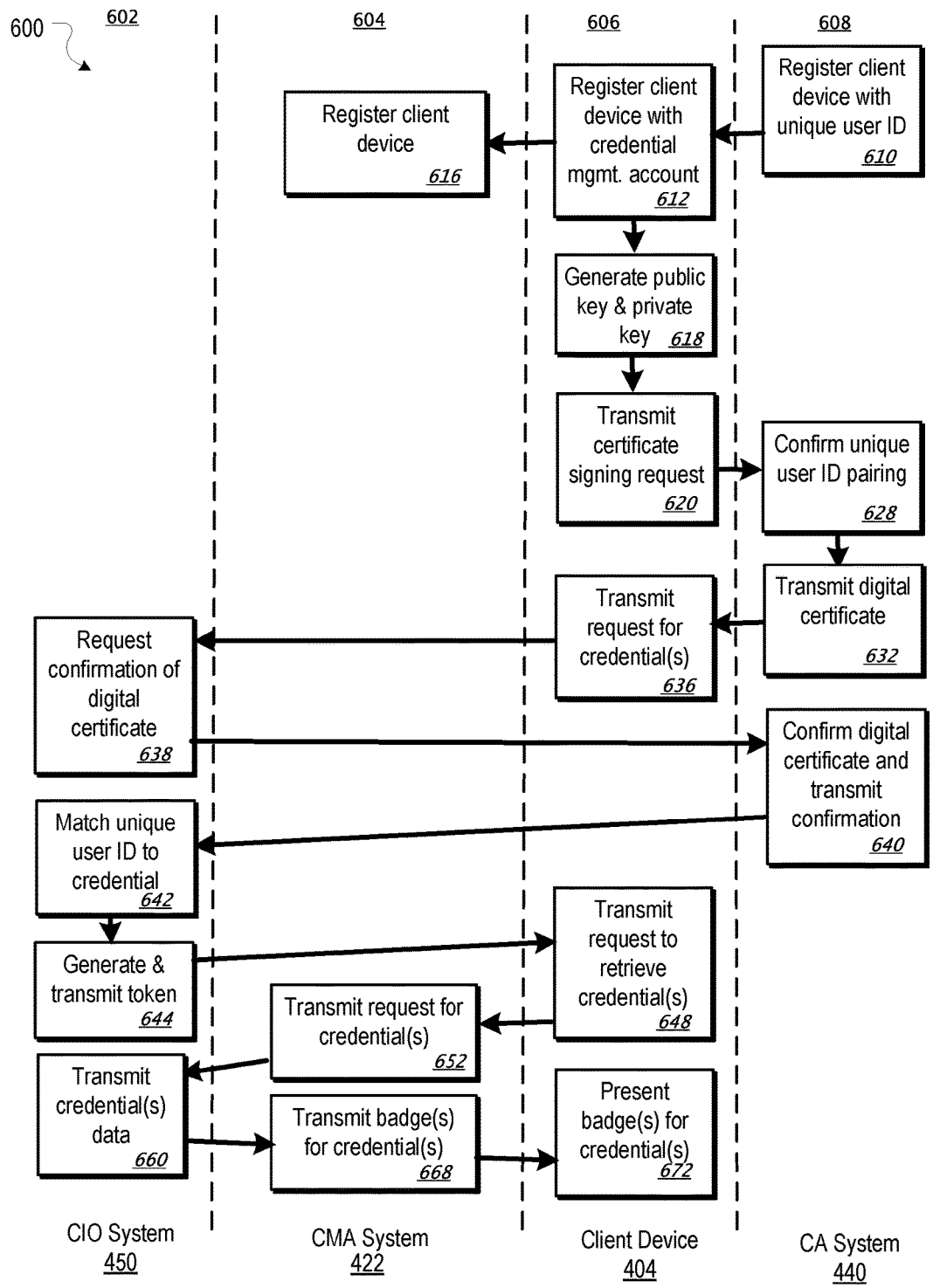
FIGS. 6A and 6B are flowcharts showing examples of processes for provisioning one or more credentials to a user of a client device.

FIG. 6A is a flowchart showing an example of a process 600 for provisioning one or more credentials to a user of a client device. In FIG. 6A, process 600 is split into parts 602, 604, 606, and 608. Part 602 may be performed by credential issuing organization (CIO) system 450. Part 604 may be performed by credential management application (CMA) system 422 (and/or by application 420). Part 606 may be performed by client device 404 (and/or client application 412). Part 608 may be performed by certificate authority (CA) system 440.

In operation, CA system 440 registers 610 client device 404 with a unique user identifier (e.g., a government issued identifier, such as a social security number). For example, the CA system 440 may be operated by a telecommunications company that operates a wireless network and sells mobile devices (e.g., cellphones, smartphones, or tablets) that access the wireless network. When a user purchases a new mobile device, the mobile device may be registered as a client device along with information about the user purchasing the mobile device and/or wireless network access. This user information may include a unique identifier for the user, such as, for example, a social security number, state issued driver's license number, or other government issued identifier, that is established for the user during the purchase transaction. In some implementations, the client application 412 may be pre-installed on client device 404 at the time of purchase. In some implementations, the client application 412 may be installed on client device 404 later by the user.

The client device 404 may register 612 itself with a credential management account that is maintained by CMA system 422. For example, user 402 may use the client application 412 on the client device 404 to log in to the CMA system 422 and create or update an account, associating the client device with that account. In response, the CMA system 422 may register 616 the client device 404 with the credential management account. For example, the CMA system 422 may maintain a record for the credential management account and the CMA system 422 may add an identifier for the client device 404 (e.g., a Media Access Control (MAC) address) and/or an identifier for the user of the client device 404 to the record for the credential management account.

The client device 404 also may generate 618 a public key/private key pair that is associated with the account. Thereafter, the client device 404 may transmit 620 a certificate signing request (CSR) to the CA system 440. The CSR may include the unique identifier for the user, the public key associated with the credential management account, and the identifier for the client device 404.

In response to receiving the CSR, the CA system 440 may check 628 records associated with the registration of the client device 404 to confirm that the unique identifier for the user and the identifier for the client device match a user/device identifier pairing stored in the device registration records of the CA system 440. If the pairing is confirmed, then the CA system 440 may generate and transmit 632, to the client device 404, a digital certificate that includes the public key associated with the credential management account and the unique identifier for the user.

Once the digital certificate is received from the CA system 440, the digital certificate may be used as part of a request for one or more credentials that is transmitted 636 from the client device 404 to the CIO system 450. In response to receiving the request for the one or more credentials from the client device 404, the CIO system 450 may request 638 confirmation of the digital certificate from the CA system 440. After confirming the digital certificate, the CA system 440 may transmit 640 an indication that the digital certificate is confirmed to the CIO system 450.

In some implementations, the digital certificate may have been digitally signed by the CA system 440. For example, the CA system 440 may have generated a digest of certain contents of the digital certificate (e.g., a unique identifier for a user, an identifier for the user's client device, and/or a public key associated with a credential management account of the user) using a hash function and then encrypted the digest using a private key of the CA system 440. The CA system 440 then may have included the encrypted digest with the other contents of the digital certificate as a digital signature. In such implementations, the CIO system 450 that receives the digital certificate may use a public key associated with the CA system 440 that is paired with the private key of the CA system 440 to decrypt the digest. For example, the public key may be obtained by additional communications between the CIO system 450 and the CA system 440 or a third party server that is a trusted part of the public key infrastructure. The CIO system 450 may also perform the same hash function on the same contents of the digital certificate as the CA system 440 and compare the resulting hash code to the decrypted digest to confirm the validity of the digital certificate. If the hash code generated by the CIO system 450 matches the decrypted digest, the CIO system 450 may determine that the digital certificate is valid.

After confirming the digital certificate, the CIO system 450 may match 642 the unique user identifier from the digital certificate to a unique identifier for a person to whom the CIO system has or will issue one or more credential(s). The CIO system 450 may have previously stored records for users to whom it has or will issue credentials. The stored user records for the CIO system 450 may include the unique identifiers for these users. For example, where the CIO system 450 is operated by an employer, the CIO system 450 may access employment records that include social security numbers for each employee to whom a credential has or will be issued from the employer. In the example, the CIO system 450 may check that an employee record exists that includes the social security number included with the request for credential(s) received from the client device 404 with the digital certificate.

Responsive to confirming the digital certificate and confirming that the unique identifier (e.g., social security number) for the user matches a record for one or more credentials issued by the CIO system 450, the CIO system 450 may generate, store, and transmit 644 a token reflecting the issuance of one or more credentials to the user. The token may include an index or pointer to a record for the credential(s) issued to the user. The record may further include a copy of the public key associated with the credential management account of the user, which may be stored for later use in communications with the client device 404 and/or the CMA system 422. Furthermore, in some implementations, the CIO system 450 may encrypt the token using the public key associated with the credential management account of the user prior to transmitting the token to the client device 404.

When the client device 404 receives the token for the credential(s) from the CIO system 450, the client device 404 may transmit 648 a request to retrieve the credential(s) to the CMA system 422. The request to retrieve the credentials may include the token. In implementations in which the CIO system 450 encrypted the token prior to transmitting the token to the client device 404, the client device 404 may decrypt the token using the private key paired with the public key associated with the credential management account of the user prior to including the decrypted token in the request to retrieve the credential(s). Responsive to the request to retrieve the credential(s), the CMA system 450 may, in turn, transmit 652 a request for the credential(s) to the CIO system 450 through a connector for the CIO system 450. The request for the credential(s) sent via the connector may include the token.

In response to the request for the credential(s) received through the connector from the CMA system 422, the CIO system 450 may identify and retrieve one or more credential records referenced by the token. The CIO system 450 may then transmit 660 data for the credential(s) through the connector to the CMA system 422.

In some implementations, the token may be associated with all (or multiple) credentials issued to the user by the CIO system 450. The CIO system 450 may return data for all (or multiple of) the credentials issued to the user through the connector to the CMA system 422. In some other implementations, the token may have a one-to-one correspondence with a particular credential issued to the user by the CIO system 450. In response to the request for the credential including the token, the CIO system 450 may return data for only the particular credential associated with the token through the connector to the CMA system 422.

The CMA system 422 may receive the data for the credential(s) and then transmit 668 to the client device 404 received data for the credential(s) including data that encodes a portion of a badge or badges representing the credential(s). In some implementations, the CMA system 422 may cache data that encodes a portion of a badge representing a credential to process future requests by a user to present the badge. In some implementations, data that encodes a portion of a badge representing a credential may not be stored locally by the CMA system 422 and instead may be retrieved from the CIO system 450 through the connector 460 each time a request to present the badge is received.

The client device 404 may render a badge or badges for the credential(s) and present 672 the badge(s) on a display of the client device 404. For example, client device 404 may present the badge(s) through graphical user interfaces 100, 200, and 300 of FIGS. 1-3.

Figure 6B:
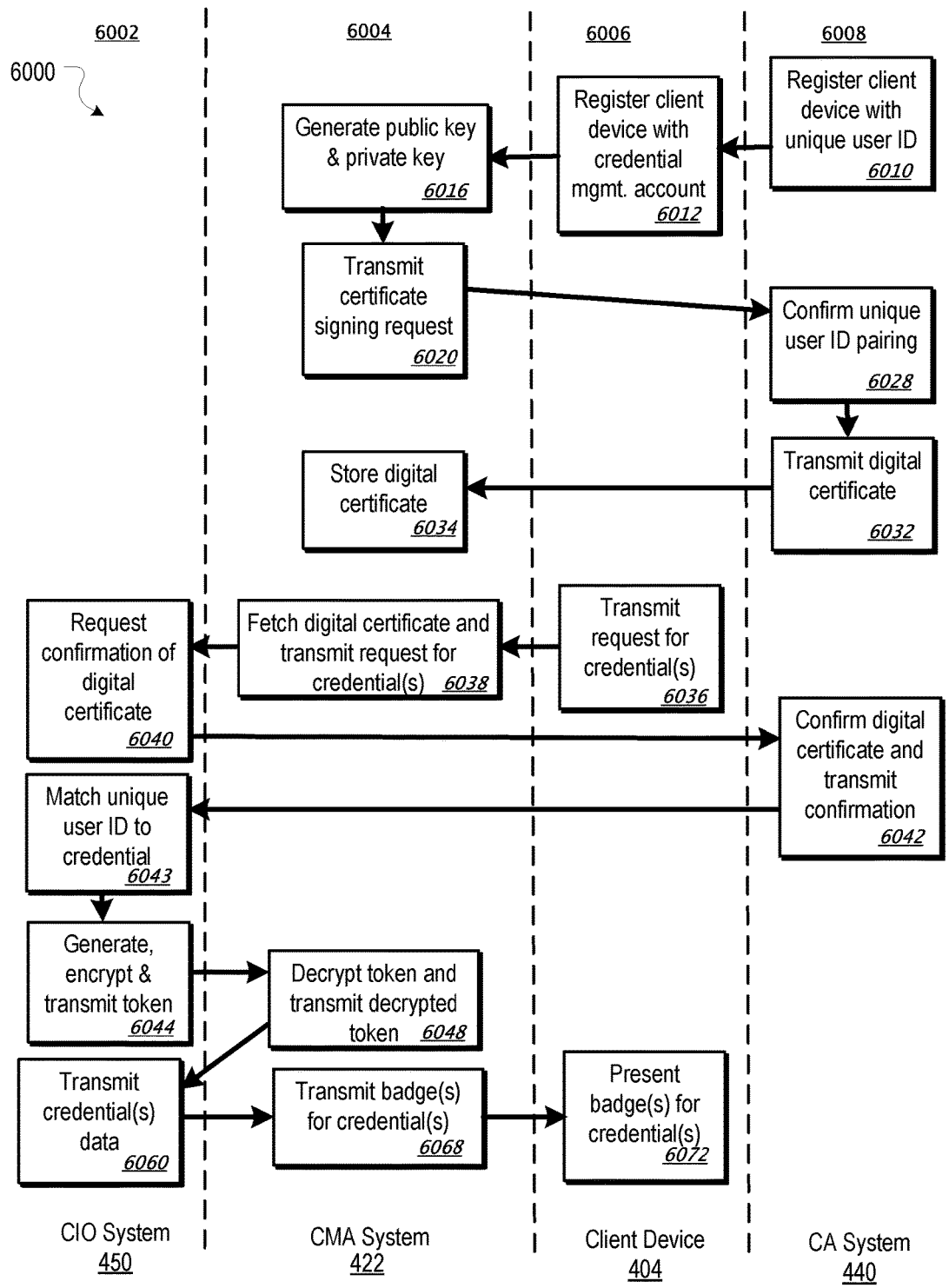

FIG. 6B is a flowchart showing an example of a process 6000 for provisioning one or more credentials to a user of a client device. In FIG. 6B, process 6000 is split into parts 6002, 6004, 6006, and 6008. Part 6002 may be performed by credential issuing organization (CIO) system 450. Part 6004 may be performed by credential management application (CMA) system 422 (and/or by application 420). Part 6006 may be performed by client device 404 (and/or client application 412). Part 6008 may be performed by certificate authority (CA) system 440.

In operation, CA system 440 registers 6010 client device 404 with a unique user identifier (e.g., a government issued identifier, such as a social security number). For example, the CA system 440 may be operated by a telecommunications company that operates a wireless network and sells mobile devices (e.g., cellphones, smartphones, or tablets) that access the wireless network. When a user purchases a new mobile device, the mobile device may be registered as a client device along with information about the user purchasing the mobile device and/or wireless network access. This user information may include a unique identifier for the user, such as, for example, a social security number, state issued driver's license number, or other government issued identifier, that is established for the user during the purchase transaction. In some implementations, the client application 412 may be pre-installed on client device 404 at the time of purchase. In some implementations, the client application 412 may be installed on client device 404 later by the user.

The client device may register 6012 itself with a credential management account that is maintained by CMA system 422. For example, user 402 may use the client application 412 on the client device 404 to log in to the CMA system 422 and create or update an account, associating the client device 404 with that account. For example, the CMA system 422 may maintain a record for the credential management account and the CMA system 422 may add an identifier for the client device 404 (e.g., a Media Access Control (MAC) address) and/or an identifier for the user of the client device 404 to the record for the credential management account. As part of the registration process, CMA system 422 also may generate 6016 and store a public key/private key pair that is associated with the account.

In some implementations, the record for the credential management account maintained by the CMA system 422 also may include data recording one or more biometric identifiers for the user. For example, the record for the credential management account may include data recording a voiceprint and/or voice signature for the user, one or more fingerprints for the user, an iris or retina scan for the user, etc. When the user initializes the credential management account, the user may provide such biometric identifiers to the CMA system 422. Thereafter, the CMA system 422 may require the user to present one or more such biometric identifiers as input to the CMA system 422 as part of an authentication process, e.g., for logging in to the credential management account.

After generating the public key/private key pair, the CMA system 422 may transmit 6020 a CSR to the CA system 440. The CSR may include the unique identifier for the user, the public key associated with the credential management account, and the identifier for the client device 404.

In response to receiving the CSR, the CA system 440 may check 6028 records associated with the registration of the client device 404 to confirm that the unique identifier for the user and the identifier for the client device match a user/device identifier pairing stored in the device registration records of the CA system 440. If the pairing is confirmed, then the CA system 440 may generate and transmit 6032, to the CMA system 422, a digital certificate that includes the public key associated with the credential management account and the unique identifier for the user. After receiving the digital certificate from the CA system 440, the CMA system 422 may store 6034 the digital certificate, for example, in connection with the record for the credential management account maintained by the CMA system.

Thereafter, the client device 404 may transmit 6036, to the CMA system 422, a request for one or more credentials issued to the user by the credential issuing organization associated with the CIO system 450. In some implementations, the CMA system 422 may require that one or more biometric identifiers for the user be included as part of the request for the credential(s). Responsive to receiving the request for the credential(s), the CMA system 422 may identify and fetch the digital certificate and transmit 6038 a request for the credential(s) that includes the digital certificate to the CIO system 450. In implementations in which the CMA system 422 requires that the request for the credential(s) include one or more biometric identifiers for the user, the CMA system 422 may authenticate the biometric identifier(s) received as part of the request for the credential(s) before transmitting the request for the credentials to the CIO system 450.

In response to receiving the request for the credential(s) from the CMA system 422, the CIO system 450 may request 6040 confirmation of the digital certificate from the CA system 440. After confirming the digital certificate, the CA system 440 may transmit 6042 an indication that the digital certificate is confirmed to the CIO system 450.

In some implementations, the digital certificate may have been digitally signed by the CA system 440. For example, the CA system 440 may have generated a digest of certain contents of the digital certificate (e.g., a unique identifier for a user, an identifier for the user's client device, and/or a public key associated with a credential management account of the user) using a hash function and then encrypted the digest using a private key of the CA system 440. The CA system 440 then may have included the encrypted digest with the other contents of the digital certificate as a digital signature. In such implementations, the CIO system 450 that receives the digital certificate may use a public key associated with the CA system 440 that is paired with the private key of the CA system 440 to decrypt the digest. For example, the public key may be obtained by additional communications between the CIO system 450 and the CA system 440 or a third party server that is a trusted part of the public key infrastructure. The CIO system 450 may also perform the same hash function on the same contents of the digital certificate as the CA system 440 and compare the resulting hash code to the decrypted digest to confirm the validity of the digital certificate. If the hash code generated by the CIO system 450 matches the decrypted digest, the CIO system 450 may determine that the digital certificate is valid.

After confirming the digital certificate, the CIO system 450 may match 6043 the unique user identifier from the digital certificate to a unique identifier for a person to whom the CIO system has or will issue one or more credential(s). The CIO system 450 may have previously stored records for users to whom it has or will issue credentials. The stored user records for the CIO system 450 may include the unique identifiers for these users. For example, where the CIO system 450 is operated by an employer, the CIO system 450 may access employment records that include social security numbers for each employee to whom a credential has or will be issued from the employer. In the example, the CIO system 450 may check that an employee record exists that includes the social security number included with the request for credential(s) received from the client device 404 with the digital certificate.

Responsive to confirming the digital certificate and confirming that the unique identifier (e.g., social security number) for the user matches a record for one or more credentials issued by the CIO system 450, the CIO system 450 may generate and store a token reflecting the issuance of one or more credentials to the user. The token may include an index or pointer to a record for the credential(s) issued to the user. This record may further include a copy of the public key associated with the credential management account of the user, which may be stored for later use in communications with the CMA system 422. The CIO system 450 also may encrypt the token using the public key associated with the credential management account of the user and transmit 6044 the encrypted token to the CMA system 422.

When the CMA system 422 receives the token from the CIO system 450, the CMA system 422 may decrypt the token using the private key paired with the public key associated with the credential management account of the user and transmit 6048 the decrypted token back to the CIO system 450. In response to receiving the correctly decrypted token back from the CMA system 422, the CIO system 450 may identify and retrieve one or more credential records referenced by the token. The CIO system 450 may then transmit 6060 data for the credential(s) through the connector to the CMA system 422.

In some implementations, the token may be associated with all (or multiple) credentials issued to the user by the CIO system 450. The CIO system 450 may return data for all (or multiple of) the credentials issued to the user through the connector to the CMA system 422. In some other implementations, the token may have a one-to-one correspondence with a particular credential issued to the user by the CIO system 450. In such implementations, the CIO system 450 may return data for only the particular credential associated with the token through the connector to the CMA system 422.

The CMA system 422 may receive the data for the credential(s) and then transmit 6068 to the client device 404 received data for the credential(s) including data that encodes a portion of a badge or badges representing the credential(s). In some implementations, the CMA system 422 may cache data that encodes a portion of a badge representing a credential to process future requests by a user to present the badge. In some implementations, data that encodes a portion of a badge representing a credential may not be stored locally by the CMA system 422 and instead may be retrieved from the CIO system 450 through the connector 460 each time a request to present the badge is received.

The client device 404 may render a badge or badges for the credential(s) and present 6072 the badge(s) on a display of the client device 404. For example, client device 404 may present the badge(s) through graphical user interfaces 100, 200, and 300 of FIGS. 1-3.

Figure 7:
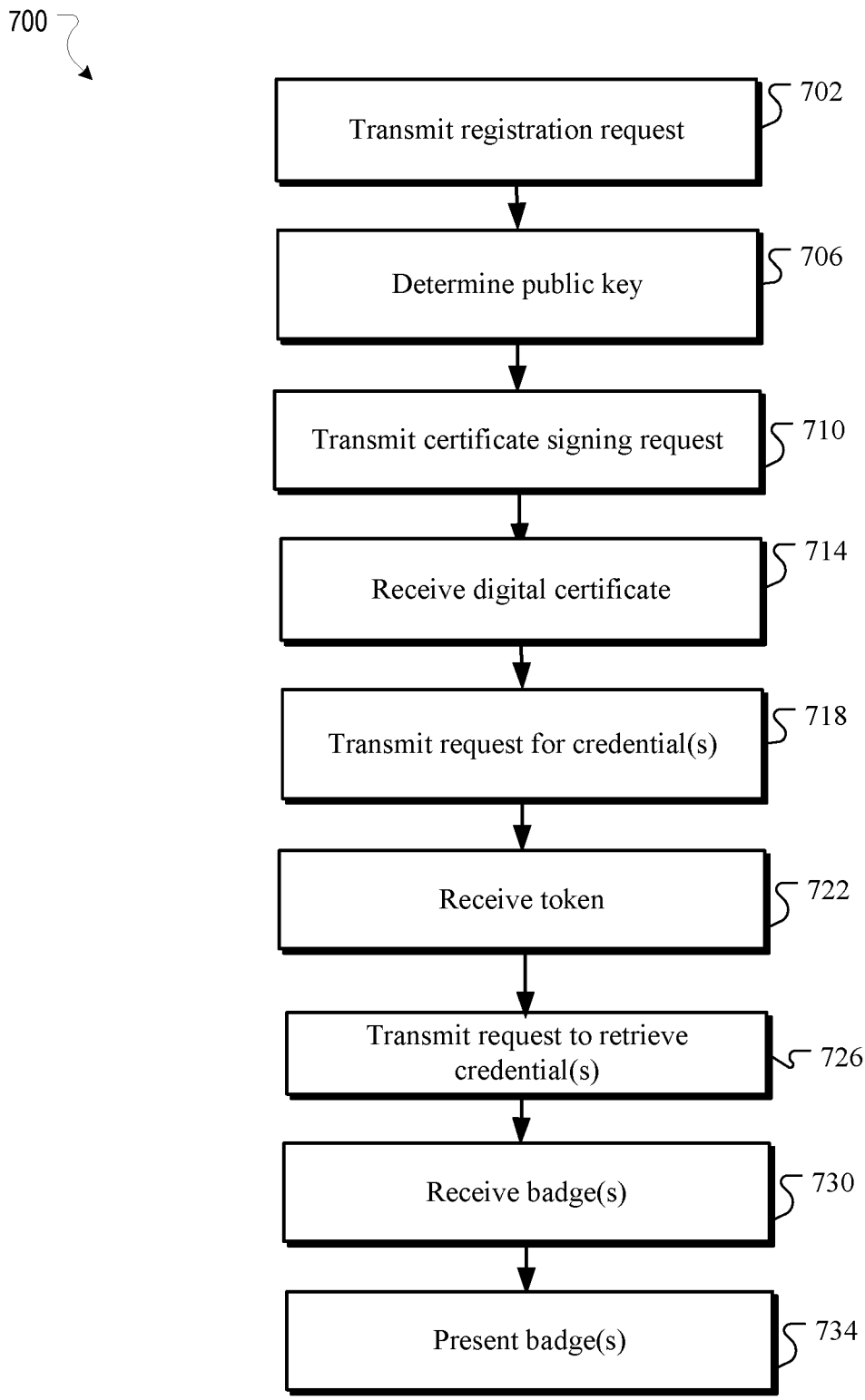
FIG. 7 is a flowchart showing an example of a process for acquiring access to one or more credentials.

FIG. 7 is a flowchart showing an example of a process 700 for acquiring access to one or more credentials. As part of process 700, a digital certificate may be acquired from a certificate authority system to increase trust in a credential management system, for example, on the part of credential issuing organizations that allow access to credentials that they issue through the credential management system. Process 700 may be performed by client device 404.

The process 700 may include transmitting 702 a registration request to a credential management application system (e.g., CMA system 422). For example, the registration request may include an identifier for a client device associated with a user. In some implementations, the registration request may include a unique identifier (e.g., a social security number or a passport number) for the user. The registration request may cause the credential management application system to create or update a credential management account for the user. For example, a user account record 426 may be created or updated by the credential management application system based on the registration request. In some implementations, the registration request may be transmitted 702 through a network interface of client device 404.

A public key is determined 706 that is part of public key/private key pair associated with the credential management account of the user. In some implementations, the public key may be determined 706 by generating a public key/private key pair. The private key may be stored securely on a client device, while the public key may be stored on the client device and transmitted to other systems, including the credential management application system, where the public key may be stored as part of a user account record. For example, the public key may be determined 706 by client device 404 generating a public key/private key pair.

A certificate signing request (CSR) may be transmitted 710 to a certificate authority system. The certificate authority system may maintain trusted records concerning unique user identifiers. In some implementations, the certificate authority may be operated by a telecommunications company that maintains records associating unique identifiers (e.g., social security numbers or passport numbers) for users with client devices, as described above. For example, the certificate authority system may be operated by an entity that provides wireless network access for the client device. The CSR may include a unique identifier for the user, an identifier for the client device (e.g., a MAC address or a serial number for client device 404), and the public key for the user's credential management account. In some implementations, the certificate authority system may be operated by a government agency that maintains records for individuals that include a unique identifier for each individual. The records may also include other authentication data, such as a password or pin issued by the government agency. In some implementations, the CSR includes authentication data (e.g., a pin or a password) for a record or account including the unique identifier for the user that is maintained by the government agency.

In some implementations, the certificate signing request may be transmitted 710 through a network interface of client device 404.

Upon confirming that a unique identifier for the user and accompanying data match a trusted record maintained by the certificate authority system, the certificate authority may generate and transmit a digital certificate including the unique identifier for the user and the public key associated with the credential management account for the user. In some implementations, the digital certificate may also include an identifier for a client device associated with the user. The digital certificate is then received 714 from the certificate authority system. The authenticity of the digital certificate may be confirmed using public-key infrastructure (PKI) that is accessible through a network (e.g., network 410). In some implementations, the digital certificate may be received through a network interface of client device 404.

A request for one or more credentials may be transmitted 718 to a credential issuing organization system. The request for the credential(s) may include the digital certificate. The credential issuing organization system may use PKI to confirm the authenticity of the digital certificate. The credential issuing organization system may also check the unique user identifier in the digital certificate against records identifying users to whom the credential issuing organization has or will issue one or more credentials. If the unique identifier for the user matches a unique identifier in a record for a credential issuance, then the credential issuing organization system may respond to the request for credential(s) by generating a token for the user that is stored by the credential issuing organization system and also transmitted to the client device that transmitted the request for credential(s). This token may be received 722 by the client device. The token may identify (or otherwise correspond to) one or more credentials that have been issued to the user, or the token may reference one or more records stored by the credential issuing organization system that identify one or more credentials that have been issued to the user. In some implementations, the token may be received 722 through a network interface of client device 404. In some implementations, the credential issuing organization may encrypt the token using the public key for the user's credential management account prior to transmitting the token to the client device.

A request to retrieve the one or more credentials may be transmitted 726 to the credential management system. The request to retrieve the credential(s) may include the token and information identifying the credential management account of the user. In some implementations, the request to retrieve the credential(s) may be transmitted through a network interface of the client device 404. In implementations in which the credential issuing organization encrypts the token using the public key for the user's credential management account prior to transmitting the token to the client device, the client device may use the corresponding private key to decrypt the token before including the token in the request to retrieve the credential(s).

The request to retrieve the credential(s) may cause the credential management application system to initiate communications with the credential issuing organization system that generated the token through a secure connector that is specific to that credential issuing organization system. The token may be forwarded to the credential issuing organization system, and the credential issuing organization may use the token to identify the credential(s) that have been issued to the user. Data for the credential(s) may be returned to the credential management application system through the connector. The credential management application system may then make some or all of this data for the credential(s) available to the user through a client application running on the client device.

Data encoding a portion of a badge representing a credential may be received 730 from the credential management system. For example, the data encoding a portion of a badge may include a name, title, an employee number, organization, expiration date, office, and/or telephone number associated with the credential. In some implementations, the data encoding a portion of the badge may include a QR code (or data capable of being encoded within a QR code) that identifies the credential. In some implementations, the data encoding a portion of the badge may include a photograph of a user associated with the credential. In some implementations, the badge is rendered by a client application on a client device based at least in part on the data encoding a portion of the badge. In some implementations, the data encoding a portion of the badge may include a graphical rendering of the one or more portions of the badge that can be directly displayed by a client device. In some cases, data encoding portions of multiple badges for various credentials may be received 730. For example, the data encoding a portion of the badge may be received 730 through a network interface of client device 404.

One or more badges for the one or more credentials may be presented 734. For example the badges may be presented in a display of the client device as shown in the graphical user interfaces 100, 200, and 300 of FIGS. 1-3. In some implementations, a badge may be presented 734 in a display to another user that is operating a validation device (e.g., validation device 406) to validate the credential represented by the badge. In some implementations, the badge may be presented 734 by transferring data to another device (e.g., validation device 406) using short range communication (e.g., infrared, near-field communications, and/or ultrasonic signal systems) for display or other processing, such as processing for validation of the represented credential.

The process may provide for access to credentials issued by a plurality of different credential issuing organizations. In some implementations, a second request for a second credential is transmitted 718 to a second credential issuing organization system. The second request for a credential may include the digital certificate. In response, a second token for the second credential may be received 722 from the second credential issuing organization system. In some implementations, the second credential issuing organization may encrypt the second token using the public key for the user's credential management account prior to transmitting the second token to the client device. A second request to retrieve the second credential may be transmitted 726 to the credential management application system. The second request to retrieve the second credential may include the second token and information identifying the credential management account. In implementations in which the second credential issuing organization encrypts the second token using the public key for the user's credential management account prior to transmitting the second token to the client device, the client device may use the corresponding private key to decrypt the second token before including the second token in the second request to retrieve the second credential. In response, data encoding a portion of the second badge representing the second credential may be received 730 from the credential management system.

Figure 8:
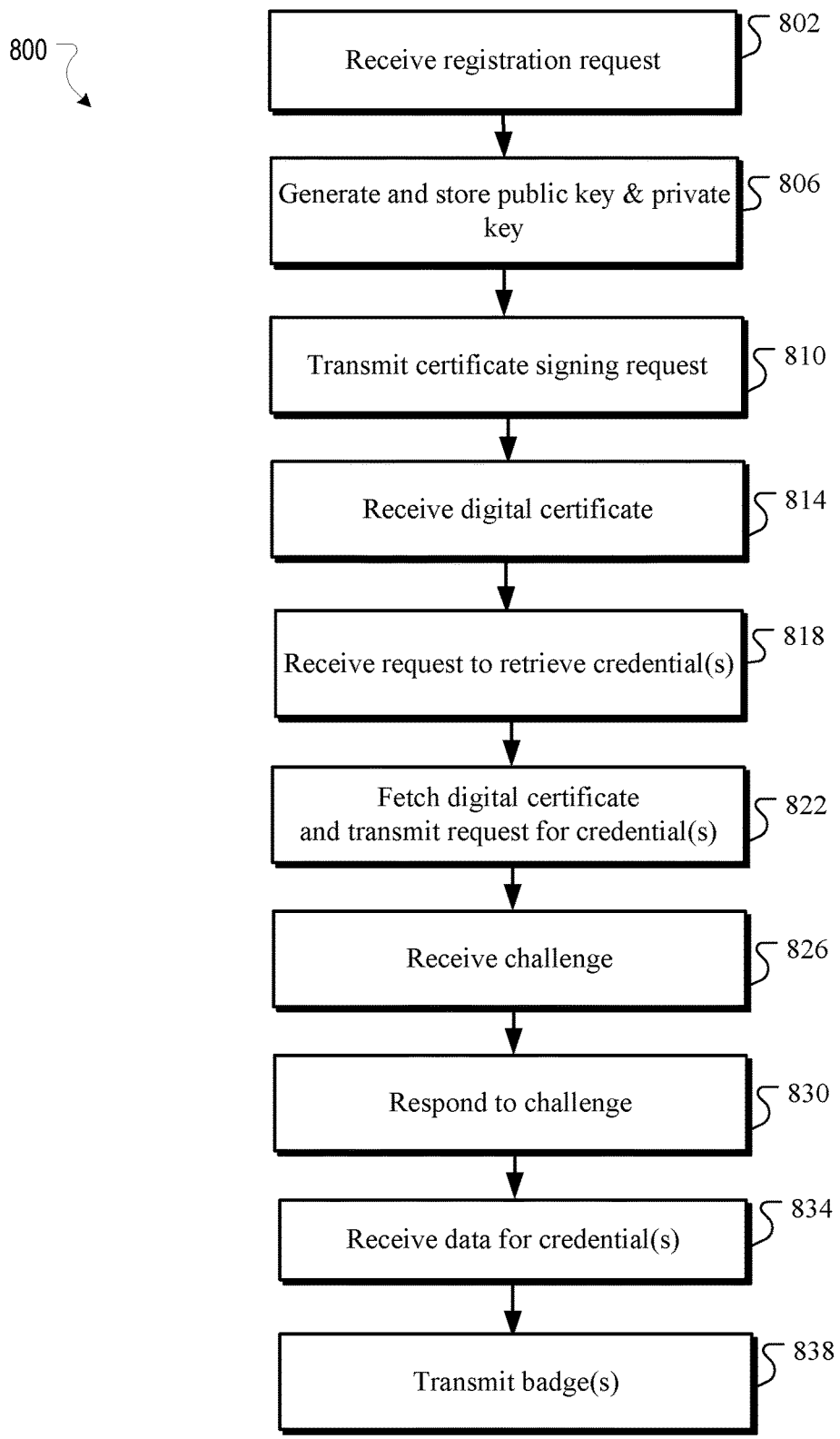
FIG. 8 is a flowchart showing an example of a process for providing access to one or more credentials.

FIG. 8 is a flowchart showing an example of a process 800 for providing access to one or more credentials. As part of process 800, a public key/private key pair may be generated. Process 800 may be performed by application 420 running on application system 422.

The process 800 may include receiving 802 a registration request from a client device. For example, the registration request may include an identifier for a client device associated with a user. In some implementations, the registration request may include a unique identifier (e.g., a social security number, a passport number, or a telephone number) for the user. In response to the registration request, a credential management account for the user may be created or updated. For example, a user account record 426 may be created or updated based on the registration request. In some implementations, the registration request may be received 802 through network interface 500 of application system 422. In some implementations, the registration request may include one or more biometric identifiers for the user. In cases where the registration request causes a credential management account for the user to be created, the received biometric identifier(s) may be stored in association with the credential management account for the user. In cases where the registration request causes the credential management account for the user to be updated, the received biometric identifiers may be authenticated before processing the registration request.

A public key/private key pair is generated 806 that is associated with the credential management account of the user. For example, the public key/private key pair may be generated 806 by application 420 running on application system 422. The public key/private key pair may be stored in connection with the user's credential management account (e.g., in user account record 426 in data repository 416).

After the public key/private key pair has been generated and stored, a CSR may be transmitted 810 to a certificate authority system. The certificate authority system may maintain trusted records concerning unique user identifiers. In some implementations, the certificate authority may be operated by a telecommunications company that maintains records associating unique identifiers (e.g., social security numbers or passport numbers) for users with client devices, as described above. For example, the certificate authority system may be operated by an entity that provides wireless network access for the client device. The CSR may include a unique identifier for the user, an identifier for the client device (e.g., a MAC address or a serial number for client device 404), and the public key for the user's credential management account. In some implementations, the certificate authority system may be operated by a government agency that maintains records for individuals that include a unique identifier for each individual. The records may also include other authentication data, such as a password or pin issued by the government agency. In some implementations, the CSR includes authentication data (e.g., a pin or a password) for a record or account including the unique identifier for the user that is maintained by the government agency.

Upon confirming that a unique identifier for the user and accompanying data match a trusted record maintained by the certificate authority system, the certificate authority may generate and transmit a digital certificate including the unique identifier for the user and the public key associated with the credential management account for the user. In some implementations, the digital certificate may also include an identifier for a client device associated with the user. The digital certificate is then received 814 from the certificate authority system. The authenticity of the digital certificate may be confirmed using public-key infrastructure (PKI) that is accessible through a network (e.g., network 410).

A request to retrieve one or more credentials may be received 818 from the client device. The request to retrieve the credential(s) may include information identifying the credential management account of the user. Additionally or alternatively, the request to retrieve the credential(s) may include one or more biometric identifiers for the user. In some implementations, the received biometric identifier(s) may be authenticated before the request to retrieve the credential is processed further. For example, the request to retrieve the credential(s) may be received 818 through network interface 500 of application system 422.

In response to receiving the request to retrieve the credential(s), the digital certificate may be fetched, and a request for the credential(s) that includes the digital certificate may be transmitted 822 to the appropriate credential issuing organization system. In response, the credential issuing organization system may issue a challenge. For example, the credential issuing organization may encrypt a string of data using the public key for the user's credential management account included in the digital certificate and transmit the encrypted string of data. The challenge from the credential issuing organization system then may be received 826 and a response generated and transmitted 830 to the credential issuing organization system. For example, the encrypted string of data may be received from the credential issuing organization, and the private key for the user's credential management account may be used to decrypt the string of data. The decrypted string of data then may be returned to the credential issuing organization system.

Receipt of the correctly decrypted string of data may cause the credential issuing organization system to transmit data for the credential(s), and the data for the credential(s) may be received 834 through a connector for the credential issuing organization system. In some implementations, the request for the credential(s) may be transmitted 818 and the data for the credential(s) may be received 834 through network interface 500 of application system 422.

Some or all of the data for the credential(s) then may be transmitted 838 to the client device associated with the user.

Data encoding a portion of a badge representing a credential may be transmitted 838 from the credential management system. For example, the data encoding a portion of the badge may include a name, title, employee number, organization, expiration date, office, and/or telephone number associated with the credential. In some implementations, the data encoding a portion of the badge may include a QR code (or data that can be encoded within a QR code) that identifies the credential. In some implementations, the data encoding a portion of the badge may include a photograph of a user associated with the credential. In some implementations, the badge is rendered by a client application on a client device based at least in part on the data encoding a portion of the badge. In some implementations, the data encoding a portion of the badge may include a graphical rendering of the one or more portions of the badge that can be directly displayed by a client device. In some cases, data encoding portions of multiple badges for various credentials may be transmitted 838. Transmission 838 of the data encoding a portion of the badge may cause a client device to present the badge (e.g., as shown in the graphical user interfaces 100, 200, and 300 of FIGS. 1-3). For example, the data encoding a portion of the badge may be transmitted 838 through network interface 500 of application system 422.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible program carrier for execution by, or to control the operation of, a processing device. Alternatively or in addition, the program instructions can be encoded on a propagated signal that is an artificially generated signal, e.g., a machine-generated electrical, optical, or electromagnetic signal that is generated to encode data for transmission to suitable receiver apparatus for execution by a processing device. The machine-readable medium can be a machine-readable storage device, a machine-readable storage substrate, a random or serial access memory device, or a combination of one or more of them.

The term "processing device" encompasses all kinds of apparatus, devices, and machines for processing data, including by way of example a programmable processor, a computer, or multiple processors or computers. The processing device can include special purpose logic circuitry, e.g., an FPGA (field programmable gate array) or an ASIC (application-specific integrated circuit). The processing device can also include, in addition to hardware, code that creates an execution environment for the computer program in question, e.g., code that constitutes processor firmware, a protocol stack, a database management system, an operating system, or a combination of one or more of them.

A computer program (which may also be referred to as a program, software, a software application, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer may be a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method, performed by a user device including one or more processors, comprising:
   transmitting, a request for a requested credential to a credential issuing organization system, the requested credential providing access to a physical location, the request for the requested credential comprising a digital certificate which includes a public key and a unique identifier for the user, wherein the public key is associated with a credential management account of the user that is maintained by a credential management system;
   receiving a token, different from the digital certificate, identifying the requested credential and a location of the public key from the credential issuing organization system;
   transmitting a request to retrieve the requested credential to the credential management system, the request to retrieve the requested credential comprising the token and information identifying the credential management account;
   receiving data encoding a portion of a badge representing the requested credential from the credential management system;
   in response to receiving the data from the credential management system, presenting the badge on a display of the user device, wherein the badge is a graphical representation of the requested credential which is read by a sensor and validated by a validation device; and
   in response to validating the badge, providing the user access to the physical location.

2. The method of claim 1, further comprising: transmitting a registration request to the credential management system to create the credential management account, the registration request comprising a unique identifier for the user device; and determining the public key associated with the credential management account.

3. The method of claim 2, wherein determining the public key comprises:
   generating the public key and a paired private key; and
   storing the public key and the private key.

4. The method of claim 1, wherein the unique identifier for the user is a government issued identification number.

5. The method of claim 1, further comprising:
   receiving data encoding a portion of a second badge representing a second credential from the credential management system.

6. The method of claim 5, wherein the second credential is issued by the credential issuing organization system.

7. One or more non-transitory machine-readable media configured to store instructions that are executable by the one or more processors to perform operations comprising:
   transmitting, by a user device, a request for a requested credential to a credential issuing organization system, the requested credential providing access to a physical location, the request for the requested credential comprising a digital certificate which includes a public key and a unique identifier for the user, wherein the public key is associated with a credential management account of the user that is maintained by a credential management system;
   receiving a token, different from the digital certificate, identifying the requested credential and a location of the public key from the credential issuing organization system;

transmitting a request to retrieve the requested credential to the credential management system, the request to retrieve the requested credential comprising the token and information identifying the credential management account;

receiving data encoding a portion of a badge representing the requested credential from the credential management system;

in response to receiving the data from the credential management system, presenting the badge on a display of the user device, wherein the badge is a graphical representation of the requested credential which is read by a sensor and validated by a validation device; and in response to validating the badge, providing the user access to the physical location.

8. The one or more non-transitory machine-readable media of claim 7, the operations further comprising: transmitting a registration request to the credential management system to create the credential management account, the registration request comprising a unique identifier for the user device; and determining the public key associated with the credential management account.

9. The one or more non-transitory machine-readable media of claim 8, wherein determining the public key comprises:
generating the public key and a paired private key; and
storing the public key and the private key.

10. The one or more non-transitory machine-readable media of claim 7, wherein the unique identifier for the user is a government issued identification number.

11. An electronic system comprising:
a user device comprising one or more processors; and
one or more machine-readable media configured to store instructions that are executable by the one or more processors to perform operations comprising:
transmitting, by the user device, a request for a requested credential to a credential issuing organization system, the requested credential providing access to a physical location, the request for the requested credential comprising a digital certificate which includes a public key and a unique identifier for the user, wherein the public key is associated with a credential management account of the user that is maintained by a credential management system;
receiving a token, different from the digital certificate, identifying the requested credential and a location of the public key from the credential issuing organization system;
transmitting a request to retrieve the requested credential to the credential management system, the request to retrieve the requested credential comprising the token and information identifying the credential management account;
receiving data encoding a portion of a badge representing the requested credential from the credential management system;
in response to receiving the data from the credential management system, presenting the badge on a display of the user device, wherein the badge is a graphical representation of the requested credential which is read by a sensor and validated by a validation device; and
in response to validating the badge, providing the user access to the physical location.

12. The electronic system of claim 11, further comprising: transmitting a registration request to the credential management system to create the credential management account, the registration request comprising a unique identifier for the user device; and determining the public key associated with the credential management account.

13. The electronic system of claim 12, wherein determining the public key comprises:
generating the public key and a paired private key; and
storing the public key and the private key.

14. The electronic system of claim 11, wherein the unique identifier for the user is a government issued identification number.

* * * * *